(12) United States Patent
Flenniken et al.

(10) Patent No.: US 6,862,592 B1
(45) Date of Patent: Mar. 1, 2005

(54) DOCUMENT PROCESSING IN A CROSS-PLATFORM ENVIRONMENT

(75) Inventors: Steve L. Flenniken, Seattle, WA (US); Roey Horns, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 419 days.

(21) Appl. No.: 10/032,246

(22) Filed: Dec. 21, 2001

(51) Int. Cl.$^7$ .............................................. G06F 17/30
(52) U.S. Cl. ........................... 707/6; 707/10; 707/1; 707/3
(58) Field of Search .................... 707/1–10, 100–104.1, 707/200–205; 700/223; 715/500, 512–514, 530–531; 705/1, 7–9; 709/200, 217, 246–247; 399/82, 75; 358/400, 403; 379/88.17, 67.1, 93.01, 90.01; 382/112, 1.9; 345/418, 440, 700, 764, 771, 772, 777, 810, 835, 839, 850, 853, 848, 961, 965

(56) References Cited

U.S. PATENT DOCUMENTS

| | | | | |
|---|---|---|---|---|
| 5,276,874 A | * | 1/1994 | Thomson | 707/102 |
| 5,367,671 A | * | 11/1994 | Feigenbaum et al. | 707/1 |
| 5,544,360 A | * | 8/1996 | Lewak et al. | 707/1 |
| 5,890,147 A | * | 3/1999 | Peltonen et al. | 707/1 |
| 6,016,162 A | * | 1/2000 | Odaka et al. | 375/240.04 |
| 6,016,494 A | * | 1/2000 | Isensee et al. | 707/102 |
| 6,094,706 A | * | 7/2000 | Factor et al. | 711/113 |
| 6,185,574 B1 | * | 2/2001 | Howard et al. | 707/200 |
| 6,317,716 B1 | * | 11/2001 | Braida et al. | 704/275 |
| 6,415,278 B1 | * | 7/2002 | Sweet et al. | 707/2 |
| 6,453,112 B2 | * | 9/2002 | Imahashi et al. | 386/46 |
| 6,496,837 B1 | * | 12/2002 | Howard et al. | 707/200 |
| 6,507,837 B1 | * | 1/2003 | De La Huerga | 707/3 |
| 6,518,069 B1 | * | 2/2003 | Otvos et al. | 436/173 |
| 6,519,612 B1 | * | 2/2003 | Howard et al. | 707/200 |
| 6,560,639 B1 | * | 5/2003 | Dan et al. | 709/218 |

* cited by examiner

*Primary Examiner*—Alford Kindred
*Assistant Examiner*—Linh Black
(74) *Attorney, Agent, or Firm*—Fish & Richardson P.C.

(57) ABSTRACT

Processing electronic documents includes retrieving a first electronic document located in a reference directory specified by a first path and searching for a second electronic document purported to be specified by a second path. If the second electronic document is not located at the second path, continue searching in a directory higher than the reference directory.

4 Claims, 3 Drawing Sheets

| Original path | 60 | SecureXfer:FirstEdition:Images:Tiffs:flower.tif |
| New path | 62 | SecureXfer:Images:Tiffs:flower.tif |
| New path | 64 | SecureXfer:FirstEdition:Tiffs:flower.tif |
| New path | 66 | SecureXfer:Tiffs:flower.tif |
| New Path | 68 | SecureXfer:flower.tif |

…

DOCUMENT PROCESSING IN A CROSS-PLATFORM ENVIRONMENT

BACKGROUND OF THE INVENTION

The invention relates to document processing in a cross-platform environment.

Electronic documents, such as publication documents, typically have information content such as text, graphics, and tables, and formatting content that directs how to display the information content. The electronic documents may be associated with external files that also may contain text, graphics, and tables. The electronic documents may employ paths to reference the external files. Document publishing systems, which include word processing systems and desktop publishing systems, allow users to create, store and retrieve electronic documents and external files in a directory structure. The directory structure is a part of a file system which is managed by a computer system. The computer system operates under a particular computing platform that includes a particular operating system such as the Macintosh™ operating system, Windows™ operating system or other operating system. A computing platform may maintain a file system, a directory structure, and a path for referencing the electronic documents and external files that has a different structure from another computing platform.

It may be difficult for users to collaborate on a publication project involving electronic documents and external files because each user may be using a different computer system running a different computing platform. For example, a first user may create an electronic document and an external file on a first computer system running a first computing platform. The first computer system forms a path specifying the location of the electronic document and the external file based, in part, on the first computing platform. A second user may attempt to access the same electronic document and external file using a second computer running a second computing platform that is different from the first computing platform. The second computer may not recognize the path referencing the external file created by the first user because the path may not be compatible across different computing platforms.

SUMMARY

In one aspect of the invention, a method of processing electronic documents includes retrieving a first electronic document located in a reference directory specified by a first path and searching for a second electronic document purported to be specified by a second path. If the second electronic document is not located at the second path, continue searching in a directory higher than the reference directory.

Embodiments of the inventions may include one or more of the following features.

A path may be formed by specifying the location of the second electronic file and the path may include a drive designation and one or more directories.

The invention offers several advantages. It allows an application program to search automatically (i.e. without user involvement) in directories for an external file and a publication across different computing platforms. Moreover, the application program can search for external files and publications that have been moved to new directories.

The details of one or more embodiments of the invention are set forth in the accompanying drawings and the description below. Other features and advantages of the invention will be apparent from the description and drawings, and from the claims.

BRIEF DESCRIPTION OF THE DRAWINGS

Like reference numbers in the figures indicate like elements.

DETAILED DESCRIPTION

Figure 1:
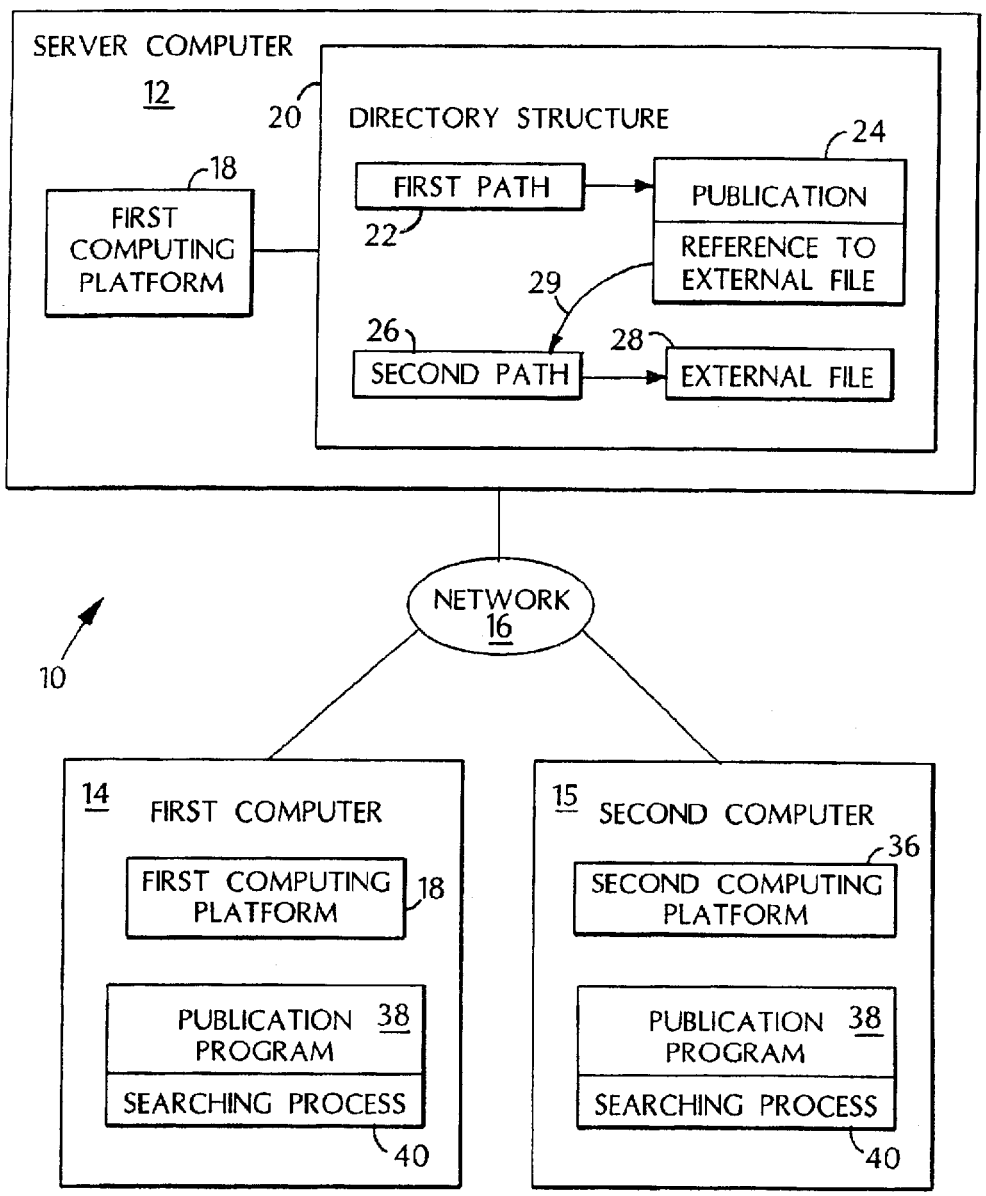
FIG. 1 is a block diagram of a network computer system for supporting a searching process.

As shown in FIG. 1, a computer network 10 includes a server computer 12 that can communicate over a network 16 with one or more computers such as a first computer 14 and a second computer 15. The server computer 12 is based on a first computing platform 18 that includes an operating system, e.g., a Windows™ operating system, Unix™ operating system, Macintosh™ operating system or other operating system. The first computing platform 18 provides for a directory structure 20 having one or more directory hierarchies for storing electronic documents and external files. For example, the directory structure 20 can include a directory structure with a first path 22 specifying the location of a first electronic document (publication) 24 and a second path 26 specifying the location of the second electronic document (external file) 28. The first path 22 may be formed using a string of one or more path identifiers such as drive designations, directories names, and a filename of the publication.

The publication 24 includes a reference to the external file 28, such as the second path 26, to specify the location of the external file 28. The second path 26 may be formed using a string of one or more path identifiers such as drive designations, directories names, and a filename of the external file. The external file 28 can contain data such as images and/or text that can be incorporated in the publication 24. The syntax of the first and second paths 22, 26, may be dependent on the computing platform. For example, the starting portion of the path may include a path identifier specifying a server designation in a Macintosh™ operating system whereas in a Windows™ operating system the path identifier may specify a drive designation.

In this example, the first computer 14 is based on a first computing platform 18 that is similar to the platform used by the server computer 12, whereas the second computer 15 is based on a second computing platform 36 that is different from the platform employed by the first computer 14; The first and second computers 14, 15 each include a publication program 38 that can allow a user to create and retrieve the publication 24 and the external file 28.

An example of a publication program 38 is the InDesign™ program from Adobe Systems Incorporated of San Jose, Calif. When the publication program 38 is executed, it loads a publication selected by the user, such as the publication 24. The publication program 38 executes a searching process 40 to search for external files, such as the external file 28, using a reference to the external file 29. The reference to the external file 29 specifies the location of the external file 28 using a path, such as the second path 26, that includes a string of directory identifiers and the filename of the external file 28. The searching process 40 is able to search for the publication 24 and/or the external file 28 using paths that may be different across different computing platforms. Moreover, the searching process 40 is able to search for the publication 24 and the external file 28 even if they were created in one directory structure and then subsequently moved to another directory structure.

Figures 2, 4:
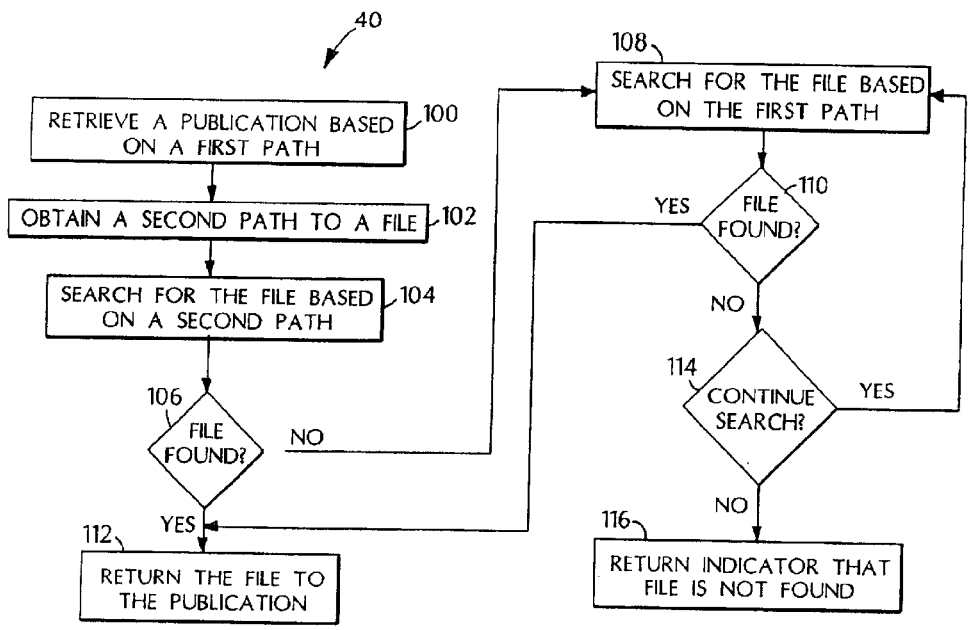
FIG. 2 is a flow diagram of a searching process.
FIG. 4 is a table listing original and new paths specifying the location of an external file.

FIG. 2 shows a searching process 40 used by the publication program 38 to search for a publication 24 and an external file 28 referenced by the publication 24. Referring to FIG. 1, a computer, such as the second client computer 15, operating under a second computing platform 36, executes the publication program 38. The publication program 38 can prompt the user for a publication and the user can respond with a publication, such as publication 24, which is subsequently retrieved 100 by the program. The location of the publication 24 is specified by the first path 22 which includes a reference directory and one or more directories higher than the reference directory concatenated together to form the path.

Referring to FIGS. 1 and 2, once the publication program 38 retrieves the publication 24, the searching process 40 obtains 102 a reference to the external file 28 such as the second path 26. The location of the external file 28 is specified by the second path 26 includes a reference directory and one or more directories higher than the reference directory concatenated together to form the path.

The searching process 40 searches 104 for the external file 28 using the second path 26. A query is then made 106 as to whether the external file 28 has been located. If the external file 28 has been located, then the searching process 40 is complete and the publication program 38 returns 112 the external file 28 to the publication 24.

On the other hand, if the external file 28 has not been located, the searching process 40 continues to search 108 for the external file by searching in the reference directory specified in the first path 22. If the external file is not found in the reference directory of the publication 24, the searching process 40 can search in directories higher than the reference directory specified by the first path 22. As the searching process 40 continues searching in directories higher than the reference directory, the process may include searching down though a hierarchy of directories for the external file 28.

A query is made 110 as to whether the file has been found. If the file has been found, then the file is returned 112 to the publication. Otherwise, an addition query is made 114 as to whether to continue searching for the file. The search for the external file 28 continues at 108 until the file is located or there are no directories higher than the reference directory specified by the first path 22 to search. If the external file 28 is not located, then the searching process 40 returns 116 to the publication an indicator that the file was not located.

Figure 3:
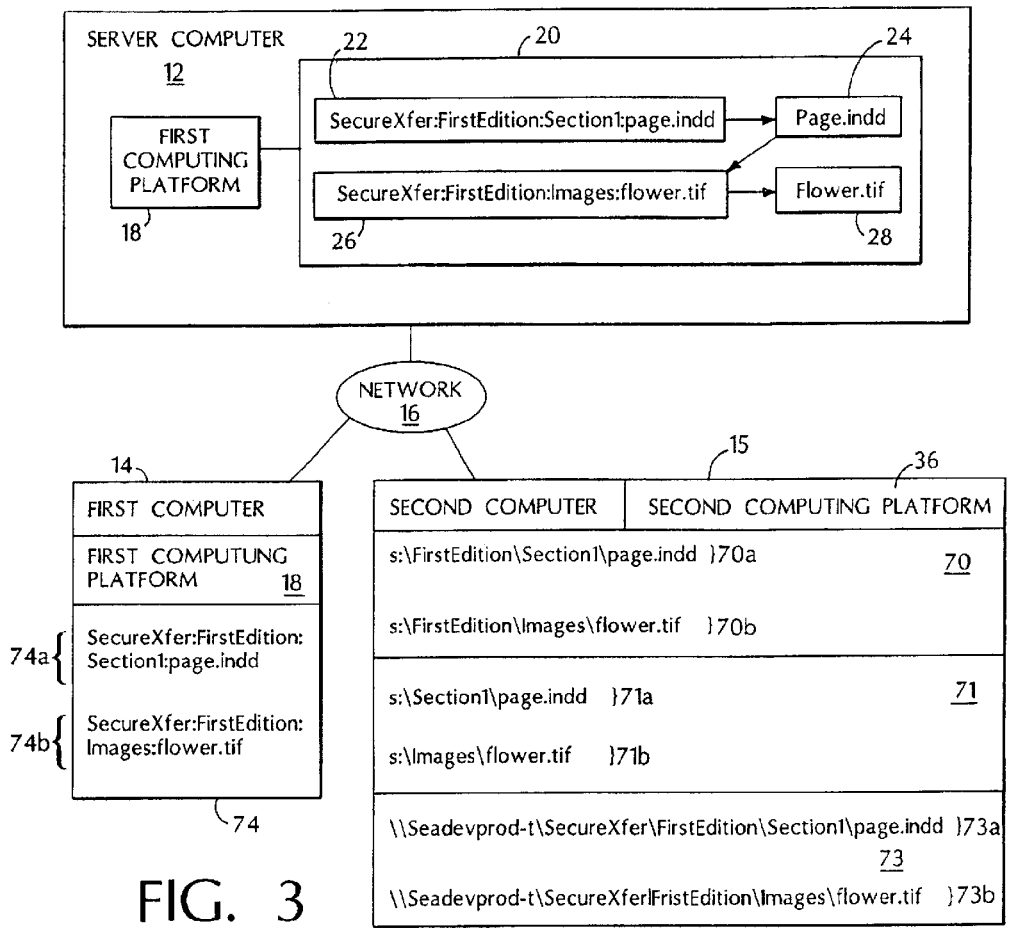
FIG. 3 is an example of a searching process as applied to a particular computing environment.

FIG. 3 illustrates an example of a searching process as applied to a particular computing environment. A server computer 12 based on a first computing platform 18 runs an operating system such as a Macintosh™ operating system. The server computer 12 includes a directory structure 20 for storing publications such as a publication 24 "page.indd". The location of the publication 24 is specified by a first path 22 that includes a filename of the publication 24 "page.indd", a reference directory "Section1", a directory at a higher level than the reference directory "FirstEdition", and a drive designation "SecureXfer". The drive designation "SecureXfer" represents the server name of a network drive which contains the directory structure 20.

The publication 24 references an external file 28 using a second path 26. In a similar manner, the directory structure 20 includes a reference to the external file 28. For example, the second path 26 specifies the location of the external file 28 and includes a filename of the external 28 "flower.tif", a reference directory "Images", a directory at a higher level than the reference directory "FirstEdition", and a drive designation "SecureXfer".

From the perspective of the first computer 14, the directory structure 20 of the server computer 12 appears as a first directory structure 74 having a first path 74a and a second path 74b. The directory structure 74 is similar to the directory structure 20 because the first computer 14 and the server computer 12 are based on the same computing platform 18.

With respect to the second computer 15, the directory structure 20 of the server computer 12 is not automatically recognized because the second computer is based on a second computing platform 36 running a different operating system such as the Windows™ operating system.

From the perspective of the second computer 15, the directory structure 20 can be represented in various forms depending on whether the second computer maps to the network drive represented by the drive designation "SecureXfer" of the directory structure 20 and depending on how this is accomplished.

For example, a directory structure 70 shows a directory structure that is formed when the drive designation "SecureXfer" is mapped to another drive designation "s" which represents the drive in which the directory resides. The directory 70 includes a first path 70a "s:\FirstEdition\Section1\page.indd" based on the first path 22 and a second path 70b s:\First\Edition\Images\flower.tif" based on the second path 26. Similarly, a directory 71 represents the directory that is formed when the drive designation "SecureXfer;FirstEdition" is mapped to the drive designation "s". The directory 71 includes a first path 71a 's:\Section1\page.indd" based on the first path 22 and a second path 71b "s:Images\flower.tif" based on the second path 26.

On the other hand, a directory 73 represents a directory structure that is formed when no mapping occurs, but instead when Windows Explorer™ is employed to recognize the directory structure 20. The paths that form the directories 70, 71, 73 on the second computer differ from the paths that form the directory structure 20 on the server computer 12. Nevertheless, the server process 40 discussed above with reference to FIG. 2 is capable of handling such differences in path structures.

When the second computer 15 executes the publication program 38, it prompts a user for a publication. In response, the user enters a publication, such as publication 24. The publication program 38 retrieves the publication 24 located at a reference directory specified by the first path 22. Since the publication 24 references the external file 28, the searching process obtains the second path 26 to the external file 28. The second path 26 is not recognized by the searching process 40 because of the difference in path structures employed by different computing platforms. Instead, the searching process 40 searches for the external file 28 in the reference directory of the publication 24. If the external file 24 is not found in the reference directory, the searching process 40 continues to search at a directory higher than the reference directory specified by the first path. As the searching process 40 continues searching in directories higher than the reference directory, the process may include searching down though a hierarchy of directories for the external file 28.

For example, it is assumed that the publication 24 "page.indd" was created on the Macintosh™ operating system and is referenced by the first path 22. The publication 24 references the external file 28 "flowers.tif" using the second path 26. If the directory 70 is used, then the searching process 40 uses the first path 70a to search for the external file 28 in the reference directory "Section 1" of the publication "page.indd". Since the external file 28 is not located in the reference directory of the publication "Section1", the searching process 40 subsequently searches in a directory "FirstEdition" higher than the reference directory of the publication "Section1". As the searching process 40 continues searching in directories higher than the reference directory, the process may include searching down though a hierarchy of the directory "FirstEdition" for the External file 28. The searching process 40 finds the external file 28 in the directory "Images".

In another example, the searching process 40 applies a similar searching method to the directory 71. In this case, the searching process 40 searches the reference directory of the publication "Section1"for the external file 28. Since the external file 28 is not found in the reference directory of the publication "Section1", the searching process 40 continues to search in directory "s:\" which is higher than the reference directory of the publication 28. The search of the directory "s:" includes searching down the directory hierarchy including directory "Images". The external file 28 is found in the directory "Images".

The searching process 40 can be used when the second computer has not created a mapping of the directory structure 20. The directory 73 represents how the second computer 15 views the directory structure 20 when it is not mapped. The searching process 40 searches for the external file at the reference directory "Section1". Like the case using the directories 70, 71, the external file 28 is not found in the reference directory "Section1". The searching process 40 continues to search for the external file 28 at a directory "FirstEdition" which is at a higher level than the reference directory "Section 1". The searching process 40 searches down the directory hierarchy and finds the external file 28 in the directory "FirstEdition\Images\".

Referring to FIG. 4, the searching process 40 searches for external files referenced by a publication in directory structures that have been moved to a new location on the same computing platform. The original path 60 includes the reference directory specifying the location of the external file "flower.tif". The new paths 62, 64, 66, 68 represent the paths including the reference directories specifying the new location of the external file "flower.tif". The searching process 40 can locate the external file "flower.tif" by searching any of the new paths 62, 64, 66, 68 as long as the new location of the external file is in one of the reference directories.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of processing electronic documents comprising:

retrieving a first electronic document located in a reference directory specified by a first path;

examining the first electronic document for a reference to a second electronic document identified in the first electronic document as having a location specified by a second path;

searching for the second electronic document at the location specified by the second path;

if the second electronic document is not located at the second path, searching the reference directory for the second electronic document;

if the second electronic document is not found in the reference directory, sequentially searching higher directories than the reference directory until the second electronic document is found; and retrieving the second electronic document if it is found.

2. A computer product residing on a computer readable medium for processing electronic documents, comprising instructions for causing the computer to:

retrieve a first electronic document located in a reference directory specified by a first path;

examine the first electronic document for a reference to a second electronic document identified in the first electronic document as having a location specified by a second path;

search for the second electronic document at the location specified by the second path;

if the second electronic document is not located at the second path, the reference directory for the second electronic document;

if the second electronic document is not found in the reference directory, sequentially search higher directories than the reference directory until the second electronics document is found; and retrieve the second electronic document if it is found.

3. The method of claim 1, further comprising:

receiving the first electronic document and the second electronic document at a first computer system operating on a first platform from a second computer system operating on a second platform different from the first platform; and storing the first electronic document and the second electronic document at locations specified in terms of the directory structure of the second platform.

4. The method of claim 3, wherein the first electronic document is stored in the reference directory.

* * * * *

UNITED STATES PATENT AND TRADEMARK OFFICE
CERTIFICATE OF CORRECTION

PATENT NO. : 6,862,592 B1 Page 1 of 1
DATED : March 1, 2005
INVENTOR(S) : Steve L. Flenniken and Roey Horns It is certified that error appears in the above-identified patent and that said Letters Patent is hereby corrected as shown below:

Column 6,
Line 66, after "path," insert -- search --.

Signed and Sealed this

Thirty-first Day of May, 2005

JON W. DUDAS
*Director of the United States Patent and Trademark Office*